United States Patent
Guo et al.

(10) Patent No.: US 10,879,510 B2
(45) Date of Patent: Dec. 29, 2020

(54) BATTERY CONTAINING ACID RESISTANT NONWOVEN FIBER MAT WITH BIOSOLUBLE MICROFIBERS

(71) Applicant: JOHNS MANVILLE, Denver, CO (US)

(72) Inventors: Zhihua Guo, Centennial, CO (US); Elam Leed, Littleton, CO (US); Luke S Weith, Centennial, CO (US); Jawed Asrar, Englewood, CO (US); Dana G Miloaga, Lakewood, CO (US)

(73) Assignee: Johns Manville, Denver, CO (US)

( * ) Notice: Subject to any disclaimer, the term of this patent is extended or adjusted under 35 U.S.C. 154(b) by 233 days.

(21) Appl. No.: 15/996,718

(22) Filed: Jun. 4, 2018

(65) Prior Publication Data

US 2018/0277812 A1    Sep. 27, 2018

Related U.S. Application Data

(62) Division of application No. 14/870,586, filed on Sep. 30, 2015, now Pat. No. 10,003,056.

(51) Int. Cl.
*H01M 2/16* (2006.01)
*C03C 13/06* (2006.01)
*C03C 3/118* (2006.01)
*C03C 3/091* (2006.01)
*B01D 39/08* (2006.01)
*D04H 1/4218* (2012.01)
*C03C 4/00* (2006.01)
*H01M 10/06* (2006.01)

(52) U.S. Cl.
CPC ........ *H01M 2/1613* (2013.01); *B01D 39/086* (2013.01); *C03C 3/091* (2013.01); *C03C 3/118* (2013.01); *C03C 4/0007* (2013.01); *C03C 13/06* (2013.01); *D04H 1/4218* (2013.01); *D10B 2101/06* (2013.01); *D10B 2201/00* (2013.01); *D10B 2505/04* (2013.01); *H01M 10/06* (2013.01)

(58) Field of Classification Search
CPC .......... H01M 2/1613; H01M 2/1633; D04H 1/4218; D10B 2101/06; C03C 3/091; C03C 3/118; C03C 4/0007; C03C 13/00; C03C 13/06

See application file for complete search history.

(56) References Cited

U.S. PATENT DOCUMENTS

| | | | |
|---|---|---|---|
| 2,489,243 A | 11/1949 | Stalego | |
| 4,112,174 A | 9/1978 | Hannes et al. | |
| 4,681,802 A | 7/1987 | Gaa et al. | |
| 4,810,576 A | 3/1989 | Gaa et al. | |
| 5,055,428 A | 10/1991 | Porter | |
| 5,945,360 A | 8/1999 | Harding et al. | |
| 6,227,009 B1 * | 5/2001 | Cusick | C03B 37/045 264/12 |
| 6,399,525 B2 | 6/2002 | Harding et al. | |
| 6,656,861 B1 | 12/2003 | Bauer et al. | |
| 7,763,558 B2 | 7/2010 | Bauer et al. | |
| 7,993,427 B2 | 8/2011 | Hassmann et al. | |
| 8,250,884 B2 | 8/2012 | Gavin et al. | |
| 10,003,056 B2 * | 6/2018 | Guo | C03C 4/0007 |
| 2004/0096670 A1 * | 5/2004 | Zguris | C03C 3/076 428/426 |
| 2009/0054580 A1 * | 2/2009 | Joachim | C03C 25/26 524/443 |
| 2013/0178126 A1 | 7/2013 | Bennett | |
| 2014/0377628 A1 | 12/2014 | Nandi et al. | |
| 2015/0099155 A1 | 4/2015 | Guo et al. | |

FOREIGN PATENT DOCUMENTS

| | | |
|---|---|---|
| CA | 2 575 900 A1 | 3/1998 |
| EP | 0 412 878 A1 | 8/1990 |
| WO | 97/11501 A1 | 3/1997 |

OTHER PUBLICATIONS

Zguris, George C., Manufacturing of Microglass Separators, Eleventh Annual Battery Conference on Applications and Advances, 1996, Long Beach, CA, Institute of Electrical and Electronics Engineers.

Potter, Russell M. and Mattson, Stephanie M., Glass fiber dissolution in a physiological saline solution, Owens-Corning Fiberglas Corporation, 2096 Glastechnische Berichte 64 Jan. 1991, No. 1, Frankfurt, DE.

* cited by examiner

*Primary Examiner* — Elizabeth A. Bolden
(74) *Attorney, Agent, or Firm* — Robert D. Touslee

(57) ABSTRACT

Acid-resistant and biosoluble glass compositions and products made therefrom. The glass compositions exhibit acid resistance, durability in white water as may be used in a wet laid fabrication process, and good biosolubility. In another aspect, a glass fiber mat is made from such a glass composition, and may be used in the manufacture of lead-acid batteries, for example as a pasting material or battery separator.

7 Claims, 4 Drawing Sheets

Sulfuric Acid Wicking Length for Glass Mats Containing Different Glass Microfibers

BATTERY CONTAINING ACID RESISTANT NONWOVEN FIBER MAT WITH BIOSOLUBLE MICROFIBERS

CROSS REFERENCE TO RELATED APPLICATION

This application is a Division of pending U.S. application Ser. No. 14/870,586 filed Sep. 30, 2015. The entire contents of the above-identified application is incorporated by reference for all purposes.

BACKGROUND OF THE INVENTION

Lead-acid batteries are widely used due to their reliability and relatively low cost. For example, most automobiles include a lead-acid battery for providing power for engine starting and other uses. Although there are many types of lead-acid batteries, their general construction includes "positive" and "negative" lead or lead alloy plates in contact with an acid electrolyte, typically dilute sulfuric acid. During discharge, electricity is produced from the reaction of the sulfuric acid and the electrode plates, the electrolyte losing dissolved sulfuric acid and lead sulfate being created in the plates. The process is reversible, so that the battery can be recharged.

It is necessary that the positive and negative plates remain electrically isolated. To this end, "separators" are used to maintain the spacing between the plates while allowing the plates to be very closely spaced. In some batteries, thin rubber sheets are used as separators, electrically isolating the plates but allowing ion exchange between the electrolyte and the plates for charging and discharging of the battery.

One particular type of lead-acid battery is the absorbed glass mat (AGM) battery. In this type of battery, a fibrous glass mat is used in the separator between the plates, and also holds the electrolyte in place between the plates by absorbing the electrolyte into the mat. This reduces the amount of electrolyte necessary, since the interior of the battery need not be completely flooded with electrolyte, and has other advantages.

Nonwoven mats are used for other purposes in lead-acid batteries as well. Improved glass mat materials are desired.

BRIEF SUMMARY OF THE INVENTION

According to one aspect, a battery comprises at least two electrodes and an electrolyte, and a nonwoven glass fiber mat within the battery. The nonwoven glass fiber mat comprises glass microfibers having a diameter between 0.2 and 5.0 microns, the glass microfibers having a biosolubility index of not more than 2.20.

According to another aspect, glass compositions exhibit a desirable combination of acid resistance, durability in white water, and biosolubility. This combination may improve the economical production of a glass fiber mat having good absorption properties, as may be especially useful in a battery separator. For example, a glass composition may consist essentially of
  64.5-69.5 mol percent $SiO_2$;
  0.5-1.7 mol percent $Al_2O_3$;
  5.0-7.5 mol percent $B_2O_3$;
  14.0-17.0 mol percent $Na_2O+K_2O$;
  0.8-1.2 mol percent F; and
  7.5-12 mol percent CaO+MgO;

and have an acid durability index of at least 1.95, a white water durability index of at least 1.85, and a biosolubility index of no more than 2.20, as those indexes are defined herein.

DETAILED DESCRIPTION OF THE INVENTION

Figure 1:
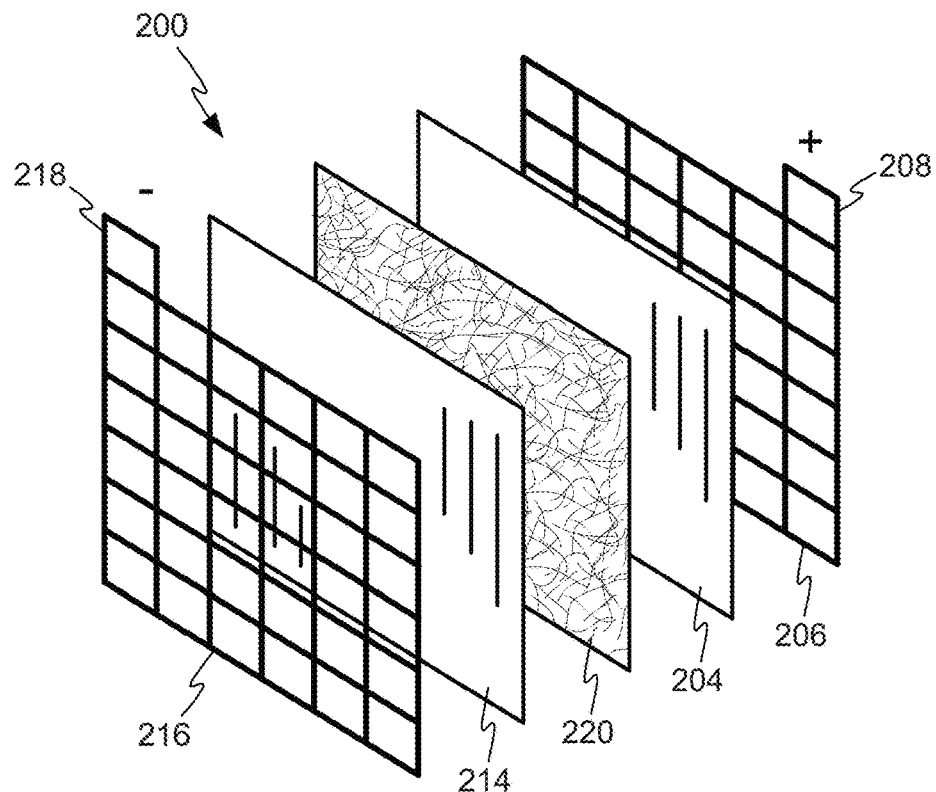
FIG. 1 illustrates an exploded perspective view of a lead-acid battery cell, in accordance with embodiments of the invention.
Figure 2:
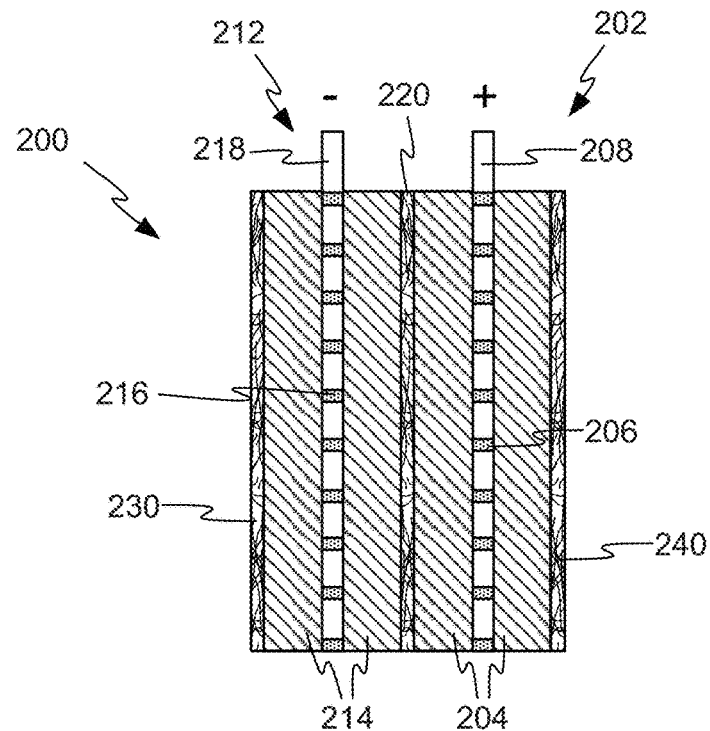
FIG. 2 illustrates a cross section view of the lead-acid battery cell of FIG. 1.

FIG. 1 illustrates an exploded partial view of a lead-acid battery cell 200, and FIG. 2 illustrates a cross-section assembled view of cell 200. Cell 200 may be, for example, comprised in a flooded lead-acid battery or an AGM battery. Each cell 200 may provide an electromotive force (emf) of about 2.1 volts. Often, batteries use several such cells connected in series to generate higher voltages. For example, a battery may include three cells 200 connected in series to provide an emf of about 6.3 volts, or may include six cells 200 connected in series to provide an emf of about 12.6 volts.

Example cell 200 includes a positive plate or electrode 202 and a negative plate or electrode 212 separated by battery separator 220 so as to electrically insulate the electrodes 202 and 212. Positive electrode 202 may include a grid or conductor 206 of lead alloy material. A positive active material 204, such as lead dioxide, is typically coated or pasted on grid 206. Grid 206 is also typically electrically coupled with a positive terminal 208. Grid 206 provides structural support for the positive active material 204 along with electrical conductivity to terminal 208.

Likewise, negative electrode 212 includes a grid or conductor 216 of lead alloy material that is coated or pasted with a negative active material 214, such as lead. Grid 216 is electrically coupled with a negative terminal 218. Like grid 206, grid 216 structurally supports the negative active material 214 and provides electrical conductance to terminal 218. In flooded type lead-acid batteries, positive electrode 202 and negative electrode 212 may be immersed in an electrolyte (not shown) that may include a sulfuric acid and water solution. In AGM type lead-acid batteries, the electrolyte may be absorbed and maintained within battery separator 220. Battery separator 220 may be positioned between positive electrode 202 and negative electrode 212 to physically separate and electrically insulate the two electrodes while enabling ionic transport, thus completing a circuit and allowing an electronic current to flow between positive terminal 208 and negative terminal 218.

Nonwoven fiber reinforcement mats 230, 240 may also be present. In the example of FIG. 2, reinforcement mats 230 and 240 are disposed on the outer surfaces of negative and positive active materials 214 and 204 respectively, but many other arrangements are possible. For example, reinforcing mats may be placed at the inner surfaces of the active materials or at both surfaces, may be embedded within the active materials, or may envelop or surround the active materials. The additional support provided by reinforcement mats 230 and 240 may help reduce the detrimental effects of shedding of the negative active material particles as the active material layer softens from repeated charge and discharge cycles. This may reduce the degradation commonly experienced by repeated usage of lead-acid batteries. The structural support provided by reinforcement mats 230 and 240 may be greatly enhanced by reducing the porosity and/or air permeability of the reinforcement mats.

Figure 3:
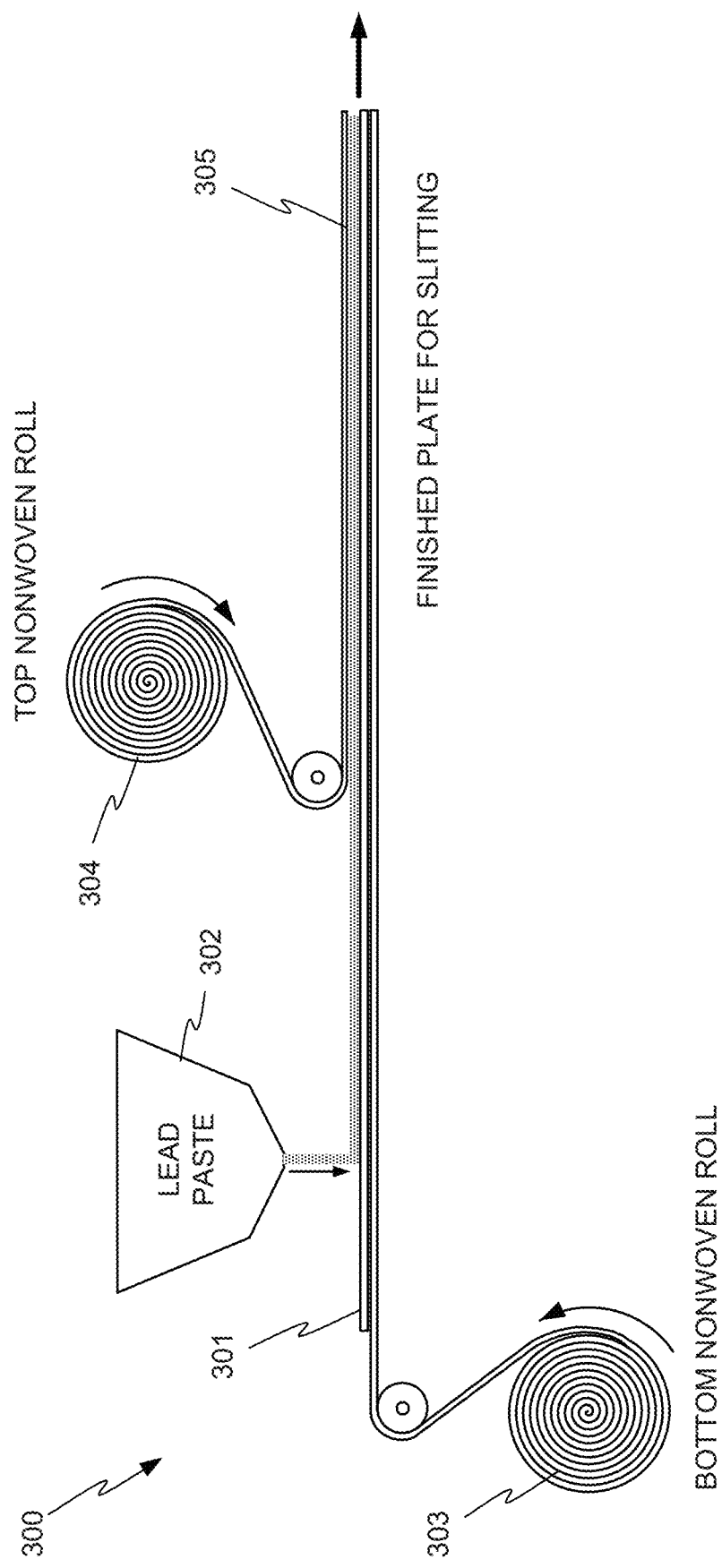
FIG. 3 illustrates an example process for the production of battery plates or electrodes.

FIG. 3 illustrates an example process 300 of production of battery plates such as plates 202 and 212. In the process of FIG. 3, a lead alloy grid 301 is transported on a conveyor toward an active material 302 applicator, which applies or pastes the active material 302 onto the grid 301. A nonwoven mat roll 303 is positioned below grid 301 so that a reinforcement mat is applied to a bottom surface of grid 301. A second nonwoven mat roll 304 is positioned above grid 301 so that a second reinforcement mat is applied to a top surface of grid 301. The resulting electrode or plate 305 may be subsequently cut to length via a plate cutter (not shown). It will be recognized that the illustration in FIG. 3 is but a simplified example, and that other components or details may be present and other variations may be used. For example, active material 302 may be applied to grid 301 and/or the top and bottom reinforcement mats so that active material 302 impregnates or saturates the mats to a desired degree. The electrode or plate 305 may be dried via a dryer (not shown) or other component of process 300.

In the example of FIGS. 1 and 2, separator 220 is a fibrous mat, but in other embodiments, additional materials may be present, for example a polymeric film. There is evidence that the combined polymer film/fibrous mat separators may not perform well in certain environments, for example when the battery is exposed to high temperatures for extended periods, such as in tropical and desert regions. Lead-acid batteries in such environments may lose some of their electrolyte water, causing the upper parts of the electrode plates to be exposed to air. The exposed negative plates may oxidize. In addition, due to the reduced volume of electrodes in contact with the electrolyte, the utilization of the active material may be reduced, lowering the capacity and performance of the battery. Finally, the loss of water increases the sulfuric acid concentration beyond optimal values. The increased acidity may reduce the battery performance, as well as be more caustic to the battery plates, separator, and case.

The use of nonwoven mats in lead-acid batteries presents certain challenges. For example, the environment within a lead-acid battery is harsh. A battery separator mat may be immersed in or saturated with sulfuric acid for the several-year life of the battery, and thus must maintain its integrity under this harsh condition.

Additionally, especially in an AGM battery, the mat must be highly absorbent, so as to maintain the electrolyte between the plates by the wicking action of the mat. In order to achieve good absorbency, it is desirable to use very fine fibers in the mat, for example fibers having a diameter of 5 microns or less. Such fibers may be referred to as "microfibers". However, the use of microfibers presents additional challenges. For example, such small fibers may be respirable, such that stray fibers may be, despite precautions, inhaled into the lungs of workers during fabrication and handling of the mats. It is thus highly desirable that any microfibers used in the mat be biosoluble. That is, the fibers should dissolve in contact with lung fluid or macrophages, to avoid the adverse health effects that may occur upon long-term residence of glass fibers in the lungs. While biosoluble glasses do exist, the requirement of biosolubility adds another constraint on the fabrication of the mat resulting from the use of microfibers.

Finally, it is desirable that the mat be economically manufactured. A particularly desirable manufacturing process is the "wet laid" process. In a typical wet laid process, a slurry of glass fiber is made by adding glass fiber to a typical white water (also called "process water") in a pulper to disperse the fiber in the white water. Typically, a fiber concentration of about 0.1-1.0 weight % glass in the white water is used. The slurry is metered onto a moving wire screen. The white water largely falls through the screen, leaving a loose wet mat of glass fibers. The wet mat is transferred to a second moving screen, and a binder such as an acrylic binder is applied. The binder may be applied using a curtain coater or dip and squeeze applicator, but other application methods may be used, for example spraying. The excess binder may be removed using a vacuum process, and the mat is dried and the binder is cured. For example, the mat may be passed through a curing oven at temperatures of 250-500° F. for a period of a few seconds to a few minutes. Examples of equipment used for making fibrous mats in the wet laid process include the Hydroformer™ manufactured by Voith Sulzer of Appleton, Wis., USA or the Deltaformer™ manufactured by North County Engineers of Glenns Fall, N.Y., USA. Additional details of the wet laid process are described in U.S. Pat. No. 4,112,174 issued to Hannes et al. on Sep. 5, 1978, U.S. Pat. No. 4,681,802 issued to Gaa et al. on Jul. 21, 1987, U.S. Pat. No. 4,810,576 issued to Gaa et al. on Mar. 7, 1989, and U.S. Patent Application Publication 2014/0377628 of Nandi et al. published Dec. 25, 2014, entire disclosures of which are hereby incorporated by reference herein.

Unfortunately, the wet-laid process, while economical and efficient, has often been unsuitable for production of mats made from primarily from glass microfibers, due in part to the tendency of fibers to break down in the pulping and mat forming process, and because of the difficulty of dewatering the mat through the screen, and drying of the mat in a typical through-air oven. Microfiber mats have therefore typically been made using specialty paper machines, which may increase the cost of the mats as compared with mats made by the wet laid process.

Thus, it is desirable to provide a fibrous mat made from microfibers having good acid resistance (for durability within a lead-acid battery) and good white water durability (to improve manufacturability by the wet laid process), and which are biosoluble for worker safety. Prior glass microfibers may have possessed one or two of these characteristics, but not all three simultaneously.

Certain empirical indexes have been developed for characterizing the performance of a glass composition. For the purposes of this disclosure, the following index definitions are used.

$$\text{Acid durability index:} \frac{[SiO_2]}{[Al_2O_3] + [B_2O_3] + [R_2O] + [RO]},$$

where $[SiO_2]$ is the mol percentage of $SiO_2$ in the glass composition, $[B_2O_3]$ is the mol percentage of $B_2O_3$ in the glass composition, [R$_2$O] is the sum of the mol percentages of Na$_2$O and K$_2$O in the glass composition, and [RO] is the sum of the mol percentages of CaO and MgO in the glass composition. A higher acid durability index is desirable, and indicates a greater durability of fibers made from the glass composition within the acid environment in a battery. A glass composition according to some embodiments of the invention may have an acid durability index of at least 1.95, and preferably at least 2.05.

$$\text{White water durability index: } \frac{[SiO_2] + 2 \times [Al_2O_3]}{2 \times [B_2O_3] + [R_2O] + [RO]}.$$

A higher white water durability index is desirable, and indicates a greater durability of fibers made from the glass composition in the pulping and mat forming process. A glass composition according to some embodiments of the invention may have a white water durability index of at least 1.85, and preferably at least 1.90.

$$\text{Biosolubility index: } \frac{50 \times [Al_2O_3]}{2 \times [B_2O_3] + [R_2O] + [RO]}.$$

A lower biosolubility index is desirable, and indicates more rapid dissolution of fibers made from the glass composition when in contact with lung fluid or macrophages. A glass composition according to some embodiments of the invention may have a biosolubility index of no more than 2.20, and preferably no more than 2.10.

In addition, a glass composition may be characterized by other parameters.

The high temperature viscosity (HTV) of a glass is the temperature at which the glass has a viscosity equal to 1000 poise. If the HTV is too high, the production of microfiber becomes more difficult and inefficient. A glass composition according to some embodiments of the invention may have an HTV of no more than 1970° F. Glass viscosity at high temperatures may be measured according to ASTM C965, using the measurement at 1000 poise as the HTV value for a particular glass.

The liquidus temperature is the upper temperature limit for devitrification. It is desired to have this temperature low enough to prevent significant devitrification in the melting and fiber forming processes. A glass composition according to some embodiments of the invention may have a liquidus temperature of no more than 1600° F., and preferably no more than 1500° F. The liquidus temperature of a glass may be measured according to ASTM C829.

Delta T is the temperature difference between HTV and the liquidus temperature, as those parameters are measured by the appropriate methods. It is desired to keep this working range sufficiently large. A glass composition according to some embodiments of the invention may have a Delta T of at least 350° F., and preferably at least 450° F.

It has been discovered that improved performance parameters can be achieved using particular proportions of certain metal oxides and other components to form a glass composition having high acid resistance and white water durability, and good biosolubility.

Preferably, glass compositions in accordance with embodiments of the invention has a composition in which the components fall within the following ranges (in mol percent):

| | |
|---|---|
| SiO$_2$ | 64.5-69.5 |
| Al$_2$O$_3$ | 0.5-1.7 |
| B$_2$O$_3$ | 5.0-7.5 |
| R$_2$O (Na$_2$O + K$_2$O) | 14.0-17.0 |
| F | 0.8-1.2 |
| RO (CaO + MgO) | 7.5-12.0. |

For the individual components of R$_2$O and RO, the components in some embodiments may fall within the following ranges (in mol percent):

| | |
|---|---|
| Na$_2$O | 14.25-16.75 |
| K$_2$O | 0.25-0.75 |
| CaO | 4.5-6.0 |
| MgO | 3.5-5.2. |

More preferably, glass compositions in accordance with embodiments of the invention have a composition in which the components fall within the following ranges (in mol percent):

| | |
|---|---|
| SiO$_2$ | 66.0-68.0 |
| Al$_2$O$_3$ | 1.0-1.6 |
| B$_2$O$_3$ | 5.5-7.5 |
| R$_2$O (Na$_2$O + K$_2$O) | 14.5-16.0 |
| F | 0.9-1.1 |
| RO (CaO + MgO) | 8.0-11.0. |

For the individual components of R$_2$O and RO, the components in some embodiments may fall within the following more preferred ranges (in mol percent):

| | |
|---|---|
| Na$_2$O | 14.5-16.0 |
| K$_2$O | 0.30-0.50 |
| CaO | 4.6-5.9 |
| MgO | 3.75-5.0. |

In some embodiments, glass compositions in accordance with embodiments of the invention may include other components, within the following ranges (in mol percent):

| | |
|---|---|
| Fe$_2$O$_3$ | 0.01-0.25 |
| TiO$_2$ | 0.05-0.30 |

For the purposes of this disclosure, the phrase "consisting essentially of" means that a claimed composition includes all of the listed components but no others, except as unavoidable impurities or in quantities that do not significantly affect the performance of the composition.

According to another aspect, a nonwoven fiber mat can be made from a glass composition according to an embodiment of the invention. Such a nonwoven fiber mat may be used, for example, in the construction of a lead-acid battery, for example as a pasting material, as a separator, or for other purposes. Such a glass fiber mat may include microfibers made from the glass composition, having a diameter of less than 5 microns.

The fibers themselves may be produced in any suitable way, for example by flame attenuation of primary molten fibers pulled from a pot or bushing with orifices in the bottom (e.g. the "pot and marble" process) or by rotary fiberization, in which molten glass is spun by centrifugal force through orifices in the sidewall of a spinning disk to form primary fibers, which may then be air or gas attenuated. Other suitable fiber forming processes may be used.

Additional details of the pot and marble process and rotary fiberization are given in U.S. Pat. No. 5,945,360 issued Aug. 31, 1999 to Harding et al., U.S. Pat. No. 6,656,861 issued Dec. 2, 2003 to Bauer et al. and titled "Glass Composition for Ultrafine Fiber Formation", U.S. Pat. No. 6,399,515 issued Jun. 4, 2002 to Harding et al. and titled "Flame Attenuated Fiberglass", U.S. Pat. No. 7,763,558 issued Jul. 28, 2010 to Bauer et al., and U.S. Pat. No. 8,250,884 issued Aug. 28, 2012 to Gavin et al. and titled "Rotary Fiberizer", the entire disclosures of which are hereby incorporate by reference herein for all purposes.

Fibers produced by different processes may have different physical characteristics. For example, the flame attenuation used in the pot and marble process may cause fibers made with the pot and marble process to have a different surface chemistry than fibers made using rotary fiberization, and the typical fiber length may be different between these two processes.

A glass fiber mat according to embodiments of the invention may include other materials, in addition to the glass fibers, for example additional fibers made from cellulose, a polymer, or another material, or a combination of materials. Examples of polymeric fibers that may be used include polyethylene terephthalate (PET), polypropylene (PP), polyethylene (PE), or combinations of these, or other materials or combinations of materials.

The nonwoven fiber mat may include fibers in groups having different mean diameters. For example, the fiber mat may include glass microfibers having an average diameter of less than 5 microns, and may include another group of fibers made from glass or other materials and having an average diameter of greater than 6 microns. In some embodiments, the second group of fibers may be formed from acid resistant glass and have an average diameter between 6 and 30 microns, and may be chopped to a length of 5 to 40 millimeters. Other combinations are also possible, for example to achieve certain mechanical performance parameters. By groups, it is meant that the groups have different intended mean diameters, for example achieved by different manufacturing processes. Different portions of the size distribution of a single kind of fibers are not considered to be separate "groups" of fibers.

If needed, an acid-resistant binder may be used to bind the nonwoven fiber mat. An acid resistant binder is usually in the form of an emulsion or solution. Examples of available acid resistant binders include RHOPLEX™ HA-16 available from the Dow Chemical Company, Hycar® 26-0688 available from Lubrizol Advanced Materials, Inc., and PLEXTOL® M 630 available from Synthomer Deutschland GmbH. Binders based on other chemistries may also be appropriate.

While it is preferable that a nonwoven fiber mat embodying the invention be made using the wet laid process, this is not a requirement. Mats embodying the invention may be made on specialty paper machines or by other suitable means.

Other additives or components may be included in a nonwoven fiber mat in accordance with embodiments of the invention, for example carbon, silica, wetting agents, or other additives.

Examples 1-4—Glass Compositions

Table 1 below gives four examples of glass compositions in accordance with embodiments of the invention, along with their performance parameters.

TABLE 1

Example Glass Compositions and Performance Parameters

| Component/Parameter | Example 1 mol % | Example 2 mol % | Example 3 mol % | Example 4 mol % | Preferred Range | More Preferred Range |
|---|---|---|---|---|---|---|
| $SiO_2$ | 66.42 | 67.12 | 67.44 | 67.07 | | |
| $Al_2O_3$ | 1.45 | 1.45 | 1.50 | 1.48 | | |
| $Fe_2O_3$ | 0.02 | 0.02 | 0.02 | 0.02 | | |
| $TiO_2$ | 0.08 | 0.08 | 0.08 | 0.08 | | |
| $B_2O_3$ | 5.96 | 6.85 | 7.10 | 5.56 | | |
| $Na_2O$ | 14.74 | 14.91 | 14.47 | 15.24 | | |
| $K_2O$ | 0.33 | 0.33 | 0.34 | 0.34 | | |
| $R_2O$ ($Na_2O + K_2O$) | 15.08 | 15.24 | 14.81 | 15.58 | | |
| CaO | 5.71 | 4.83 | 4.78 | 5.35 | | |
| MgO | 4.81 | 3.93 | 3.77 | 4.32 | | |
| RO (CaO + MgO) | 10.52 | 8.77 | 8.54 | 9.67 | | |
| $F_2$ | 0.95 | 0.94 | 1.04 | 1.08 | | |
| HTV (° F.) | 1950 | 1951 | 1951 | 1950 | ≤1970 | |
| Liquidus (° F.) | 1517 | 1498 | 1440 | 1440 | ≤1600 | ≤1500 |
| Delta T (° F.) | 433 | 453 | 511 | 510 | ≥350 | ≥450 |
| Acid Durability Index | 2.01 | 2.08 | 2.11 | 2.08 | ≥1.95 | ≥2.05 |
| White water Durability Index | 1.85 | 1.86 | 1.88 | 1.93 | ≥1.85 | ≥1.90 |
| Biosolubility Index | 1.94 | 1.93 | 1.99 | 2.04 | ≤2.20 | ≤2.10 |

Example 5—Glass Composition

Glass ingots were prepared using an electric crucible starting from the following raw materials: silica, boric acid, aluminum oxide, sodium carbonate, potassium carbonate, calcium carbonate, magnesium carbonate, aluminum fluoride or calcium fluoride. The glass ingots were cylindrical in shape and had approximately 0.75 inch diameter and lengths ranging from 0.25 inch to 1.25 inch. Table 2 shows the target composition and performance parameters of the glass prepared.

The glass in Example 5 is expected to be biosoluble, having a biosolubility index of 2.05. The high temperature viscosity and the liquidus temperature indicate that this glass is suitable for the pot and marble fiberization process.

TABLE 2

Glass Composition and Performance Parameters

| Component (mol %)/Parameter | Example 5 |
|---|---|
| $SiO_2$ | 66.87 |
| $Al_2O_3$ | 1.48 |
| $B_2O_3$ | 5.53 |
| $Na_2O$ | 15.17 |
| $K_2O$ | 0.33 |
| CaO | 5.54 |
| MgO | 3.99 |
| $F_2$ | 1.08 |
| HTV ($10^3$ Poise) | 1950° F. |
| Liquidus (° F.) | 1530° F. |
| Delta T (° F.) | 420° F. |
| Acid Durability Index | 2.09 |
| White water Durability Index | 1.93 |
| Biosolubility Index | 2.05 |

The composition of the glass ingots described in Example 5 has been verified using X-Ray Fluorescence. Table 3 shows the chemical composition determined for three different samples of glass from Example 5.

TABLE 3

Measured Chemical Composition of Glass Ingot Samples

| Component (mol %) | Example 5. Sample 1 | Example 5. Sample 2 | Example 5. Sample 3 |
|---|---|---|---|
| SiO2 | 66.74 | 66.94 | 66.85 |
| Al2O3 | 1.50 | 1.46 | 1.56 |
| B2O3 | 5.32 | 5.30 | 5.31 |
| Na2O | 15.30 | 15.17 | 15.13 |
| K2O | 0.34 | 0.33 | 0.34 |
| CaO | 5.46 | 5.51 | 5.49 |
| MgO | 4.26 | 4.27 | 4.26 |
| F2 | 1.08 | 1.01 | 1.06 |

Example 6—Microfibers

The glass ingots described in Example 5 were fiberized in a pot and marble process. The ingots were remelted in a pot and glass microfibers were produced by flame attenuation of primary fibers (50 μm to 500 μm diameter) pulled from the pot through a bushing with orifices in the bottom. Using the same process, glass microfibers were produced from two commercially available Johns Manville glasses described in terms of composition and performance parameters in Table 4. The glass in Example C1 is acid resistant and moisture resistant, but has lower biosolubility (biosolubility index higher than 2.20). The glass in Example C2 has very good acid resistance and is biosoluble, but has lower moisture resistance, reflected in a lower white water durability index of 1.83. Since moisture resistance is critical for processing glass fiber products into nonwoven mats, the glass microfibers in Example C2 are not well suited for nonwoven glass mat applications, in spite of their excellent performance in acid environments.

TABLE 4

Composition and Performance Parameters of Comparative Glasses Fiberized in the Pot and Marble Process

| Component (mol %)/Parameter | Example C1 | Example C2 |
|---|---|---|
| SiO2 | 65.51 | 67.13 |
| Al2O3 | 1.77 | 1.04 |
| B2O3 | 4.58 | 6.09 |
| Na2O | 15.80 | 15.63 |
| K2O | 0.40 | 0.32 |
| CaO | 6.27 | 4.97 |
| MgO | 4.10 | 4.81 |
| F2 | 1.58 | 0.00 |
| HTV ($10^3$ Poise) | 1930 | 1940 |
| Liquidus (° F.) | 1540 | 1480 |
| Delta T (° F.) | 390 | 460 |
| Acid Durability Index | 1.99 | 2.04 |
| White water Durability Index | 1.93 | 1.83 |
| Biosolubility Index | 2.47 | 1.37 |

The diameter of glass fibers produced in the pot and marble process has been determined using the Brunauer-Emmett-Teller (BET) surface area test method using krypton. To further characterize the glass microfibers produced, handsheets approximately 8 inch by 8 inch were prepared by mixing glass microfibers with acidic water (pH 2.0 to 3.0), blending in a two speed Waring electric mixer with one liter stainless steel jar, pouring the blend in a mold and filtering through 100 mesh, 9 inch by 9 inch forming screen. The handsheets were dried in an oven at 100° C. to 150° C., until all water was removed. For pressure drop measurements through handsheets, 2.1 g of glass microfiber were used per handsheet; 1.0 N sulfuric acid was added to the water so that the pH was between 2.8 and 3.2 and blending time was 60 seconds. For tensile properties measurements, 5 g of glass microfiber were used per handsheet, and 1.8N sulfuric acid was added so that the pH of the blend was between 2.0 and 2.2. The mixture was blended for 30 seconds at the low setting and for additional 60 seconds at the high setting. The tensile strength and elongation at break were measured using an Instron testing machine. The tensile strength is reported as load (in pounds) required to break a 1 inch by 6 inch strip cut from the handsheet.

Table 5 shows the results of the characterization of glass microfibers produced using the pot and marble process. Each result reported represents the average of five measurements. The results show that the glass described in Example 5 is processable into glass microfibers comparable with commercially available glass microfibers produced products.

TABLE 5

Characteristics of Glass Microfibers Prepared in the Pot and Marble Process

| Glass Microfiber Characteristics | Example 5 | Example C1 | Example C2 |
|---|---|---|---|
| BET fiber diameter (μm) | 0.672 | 0.673 | 0.724 |
| Handsheet Pressure Drop (mm H2O) | 16.45 | 13.83 | 14.3 |
| Handsheet Tensile Load (lb) | 3.99 | 3.66 | 4.68 |
| Handsheet Elongation (%) | 1.37 | 1.44 | 1.17 |

The chemical durability of glass microfibers described in Example 5 and Comparative Examples C1 and C2 was evaluated in static dissolution tests. Fibers of each type were placed in acidic medium (pH=2), and neutral medium (pH=7), and maintained at a temperature of 40° C. for seven days. In each case the amount of fiber was approximately 3 g and the amount of solution was 500 ml. Solution samples were extracted at regular intervals to analyze the leaching of the glass components into the solution. Two samples of each type of glass microfiber have been tested at each pH. At the end of the seven days, the fiber was dried and weighed to determine the mass loss.

Figure 4:
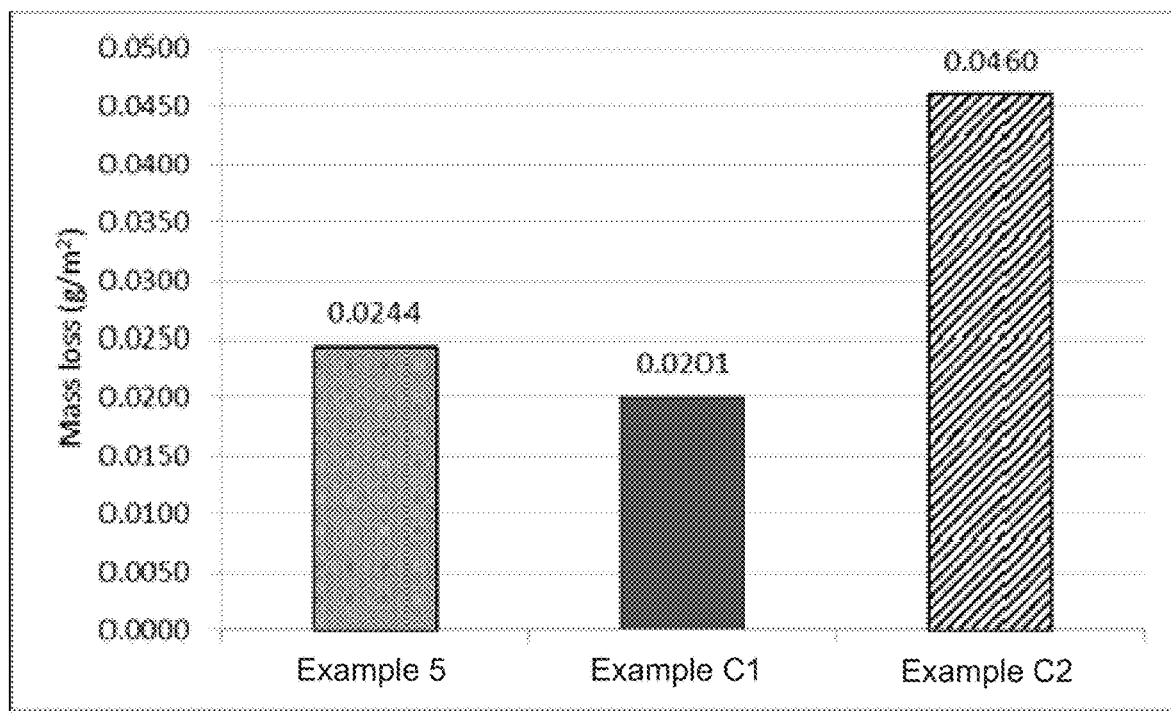
FIG. 4 and FIG. 5 show the normalized average mass loss for a glass type according to an embodiment of the invention and two comparative examples, at pH=7 and pH=2 respectively.
Figure 5:
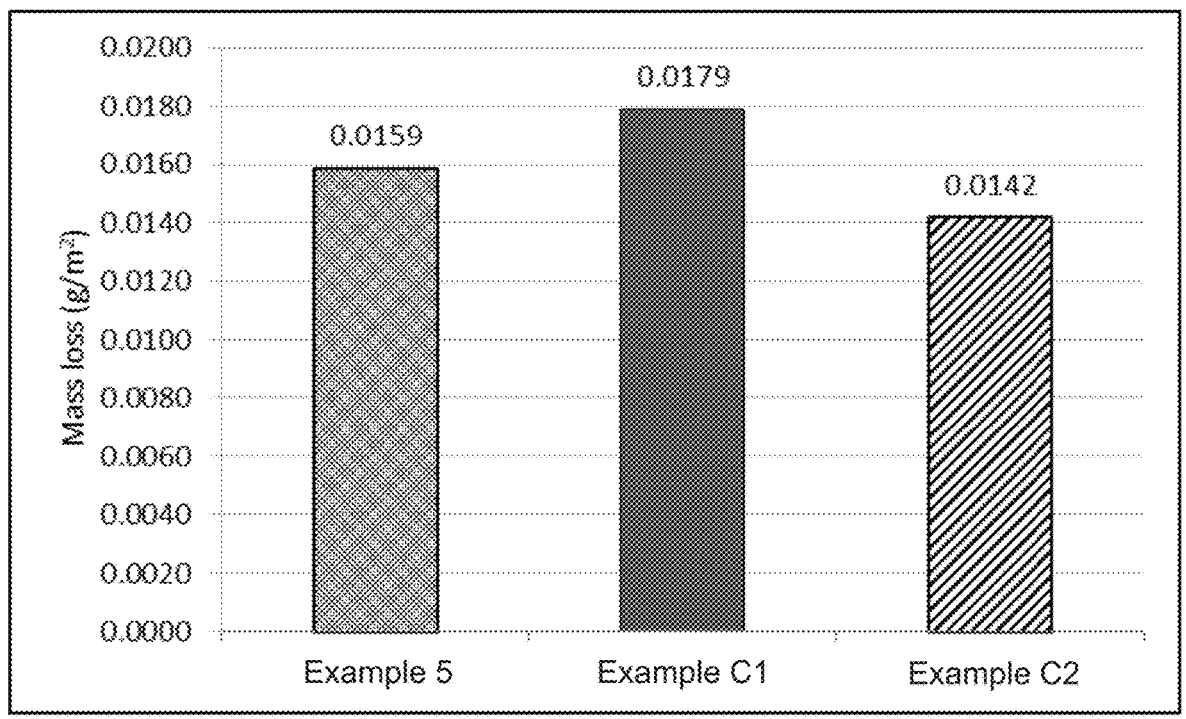

Table 6 shows the weight loss measured for the glass microfibers in static dissolution tests. FIG. 4 and FIG. 5 show the normalized average mass loss for each type of glass microfiber at pH=7 and pH=2 respectively. Glass microfibers in Example 5 have excellent durability in acidic environment and are similar in this respect with the glass microfibers in Comparative examples C1 and C2, which are known for acid resistance. At neutral pH, the glass microfiber samples in Example 5 lose 50% less mass than the glass microfibers in Comparative Example C2, which are known to have low water resistance, and are comparable in terms of mass loss with glass microfibers from Example C1, which have excellent water resistance.

TABLE 6

Chemical Durability of Glass Microfibers

| Glass Microfiber | Fiber diameter (μm) | Mass Loss at pH = 2 (g/m$^2$) | Mass Loss at pH = 7 (g/m$^2$) |
|---|---|---|---|
| Example 5 | 0.672 | 0.0157 | 0.0243 |
| Example 5 | 0.672 | 0.0160 | 0.0244 |
| Example C1 | 0.673 | 0.0182 | 0.0211 |
| Example C1 | 0.673 | 0.0176 | 0.0191 |
| Example C2 | 0.724 | 0.0137 | 0.0452 |
| Example C2 | 0.724 | 0.0146 | 0.0468 |

Example 7—Glass Mat

Nonwoven glass mat samples were made with a wet-laid machine. Process water with pH greater than 5 was used. The targeted basis weight for the nonwoven glass mats was 1.1 lb/sq (pounds per 100 square feet) and the targeted loss on ignition (LOI) was 20%. All mats contained the same organic binder and a combination of Johns Manville glass fibers type K249T (nominal fiber diameter of about 13 μm and length of 0.75 inch) and glass microfiber. Mats were prepared containing Example 5, Example C1 and Example C2 glass microfibers. Only one type of glass microfiber was incorporated in each mat and the ratio between K249T glass fiber and glass microfiber was 70/30 in each mat. The mats were laid on a fine chain belt and the binder was cured in an oven.

Table 7 describes the composition, basis weight and LOI of the nonwoven mats produced.

TABLE 7

Properties of Nonwoven Glass Mats Incorporating Different Glass Microfiber

| Glass Microfiber | Basis Weight (lb/sq) | LOI (%) | Thickness (10$^{-3}$ inch) | Air permeability (ft$^3$/ft$^2$-min) |
|---|---|---|---|---|
| Example 5 | 1.13 | 19 | 17 | 97 |
| Example 5 | 1.14 | 19 | 18 | 67 |
| Example 5 | 1.12 | 20 | 17 | 85 |
| Example 5 | 1.11 | 20 | 17 | 63 |
| Example C1 | 1.07 | 22 | 17 | 78 |
| Example C1 | 1.08 | 20 | 17 | 117 |
| Example C1 | 1.14 | 22 | 16 | 138 |
| Example C1 | 1.08 | 21 | 17 | 116 |
| Example C2 | 1.09 | 20 | 17 | 62 |
| Example C2 | 1.19 | 19 | 18 | 88 |

Air permeability was measured according to ASTM Standard Method D737 using a TEXTEST Air Permeability Tester model FX 3300 manufactured by ATI Corporation (Greer, S.C.). This test was usually carried out at a differential pressure of about 0.5 inches of water (125 Pa). Thickness was measured with a gauge under pressure of 1.7 KPa.

Figure 6:
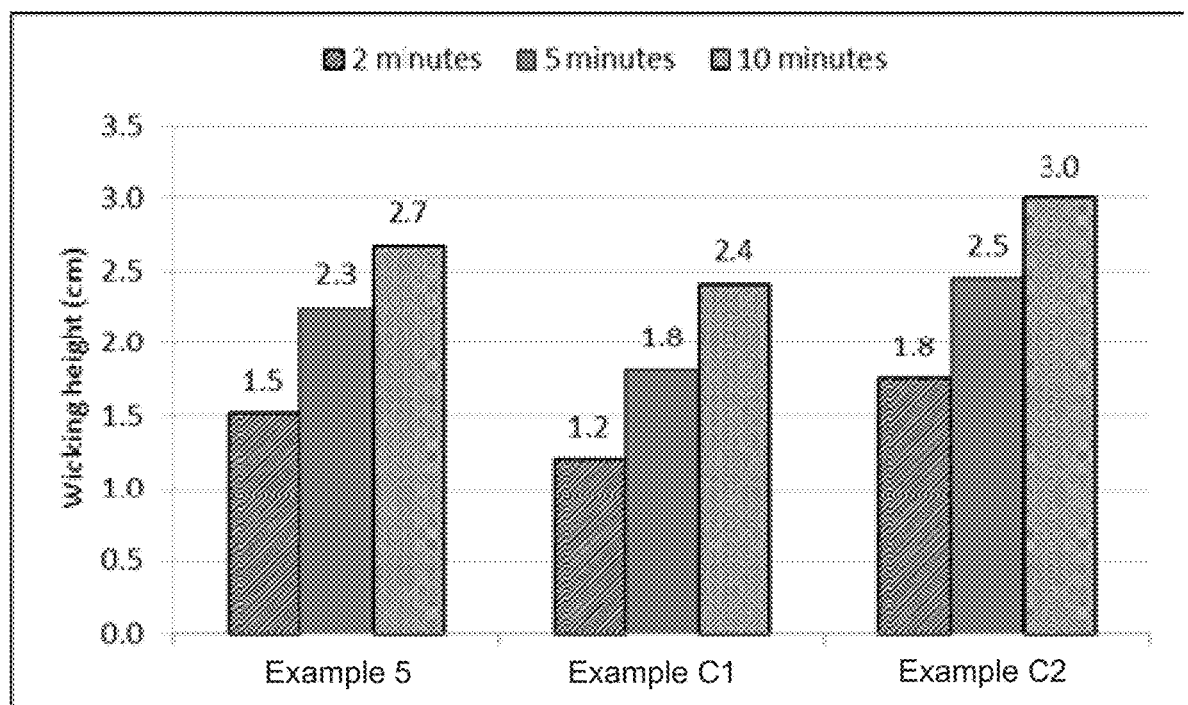
FIG. 6 shows the wicking length for sulfuric acid on glass mats containing glass microfiber of the compositions according to the embodiment and the two comparative examples of FIGS. 4 and 5.

Wicking strength per length or capillary rise was determined according to ISO8787:1986, with the wicking medium being 40 wt % sulfuric acid. FIG. 6 shows the wicking length for sulfuric acid on glass mats containing glass microfiber described in Example 5 and Comparative Examples C1 and C2. The wicking length was measured after two, five, and ten minutes respectively. The wicking behavior of glass mats containing glass microfiber described in Example 5 is similar to that of mats containing both types of acid resistant glass microfibers (Examples C1 and C2). The results show that the glass described in Example 5 has good processibility into glass mat designs such as those used for battery applications.

While mats according to embodiments of the invention have been described in the context of lead acid batteries, it will be recognized that mats and glass compositions embodying the invention may be used in other applications as well. The glass compositions described herein may have a lower cost than previous biosoluble glass compositions suitable for microfiber formation, in part due to the overall lower cost of the basic components of the current embodiments. For example, embodiments of the invention have a lower $B_2O_3$ content as compared with, for example, the biosoluble glass compositions described in U.S. Pat. No. 6,656,861, previously incorporated herein by references.

In addition to the performance of glasses embodying the invention, their lower cost may make them attractive for many applications, including applications that may not require acid resistance.

For example, filtration media may use microfibers, alone or in combination with larger fibers, for efficient filtration of gases or liquids. In some embodiments, a filter medium includes a nonwoven mat that includes glass fibers made from the glass compositions described and claimed herein. Additional details of the construction of fibrous filter media are given in U.S. Pat. No. 7,993,427 issued Aug. 9, 2011 to Hassmann et al., the entire disclosure of which is hereby incorporated by reference herein.

In another example, microfibers according to embodiments of the invention may be included in a fiber mat to impart smoothness or other surface characteristics to the fiber mat. An example of the use of microfibers for providing a smooth surface is described in more detail in U.S. Patent Application Publication No. 2013/0178216 of Bennett published Jul. 11, 2013, the entire disclosure of which is hereby incorporated by reference herein.

In addition, fiber mats and glass compositions according to embodiments of the invention may be used in other applications as well, for example insulation, fire protection, or other applications.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A battery, comprising:
   at least two electrodes and an electrolyte; and
   a nonwoven glass fiber mat within the battery, the nonwoven glass fiber mat comprising glass microfibers having a diameter between 0.2 and 5.0 microns, the glass microfibers having a biosolubility index of not more than 2.20;
   wherein the glass microfibers are made of a glass composition consisting essentially of:
   64.5-69.5 mol percent $SiO_2$;
   0.5-1.7 mol percent $Al_2O_3$;
   5.0-7.5 mol percent $B_2O_3$;
   14.0-17.0 mol percent $Na_2O+K_2O$;
   0.5-1.5 mol percent F; and
   7.5-12 mol percent CaO+MgO.

2. The battery of claim 1, wherein the glass microfibers have a biosolubility index of not more than 2.10.

3. The battery of claim 1, wherein the glass microfibers have an acid durability index of at least 1.95 and a white water durability index of at least 1.85.

4. The battery of claim 1, wherein the glass microfibers are comprised in a first group of fibers, and wherein the nonwoven glass mat further comprises a second group of fibers made from glass or other materials and having an average diameter of greater than 6 microns.

5. The battery of claim 1, wherein the battery comprises a battery separator including the nonwoven glass fiber mat.

6. The battery of claim 1, wherein the battery comprises a pasting material including the nonwoven glass fiber mat.

7. The battery of claim 1, wherein the battery is a lead acid battery comprising an absorbent glass mat (AGM), the absorbent glass mat including the nonwoven glass fiber mat.

* * * * *